United States Patent
Sugimoto et al.

(10) Patent No.: US 7,416,590 B2
(45) Date of Patent: Aug. 26, 2008

(54) WATER-BASED INK SET FOR INK-JET RECORDING

(75) Inventors: Junichiro Sugimoto, Aichi-ken (JP); Masaya Fuijoka, Aichi-ken (JP); Ryuji Kato, Aichi-ken (JP); Narumi Koga, Aichi-ken (JP); Shunichi Higashiyama, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 239 days.

(21) Appl. No.: 11/296,430

(22) Filed: Dec. 8, 2005

(65) Prior Publication Data

US 2006/0119681 A1   Jun. 8, 2006

(30) Foreign Application Priority Data

Dec. 8, 2004   (JP) ............................. 2004-355901

(51) Int. Cl.
*C09D 11/02*   (2006.01)

(52) U.S. Cl. .................. 106/31.27; 106/31.6

(58) Field of Classification Search .............. 106/31.27, 106/31.6
See application file for complete search history.

(56) References Cited

U.S. PATENT DOCUMENTS

| 5,609,671 A | 3/1997 | Nagasawa |
| 5,837,045 A | 11/1998 | Johnson et al. |
| 2006/0203058 A1* | 9/2006 | Nerad et al. ................ 347/100 |

FOREIGN PATENT DOCUMENTS

| JP | 8 3498 | 1/1996 |
| JP | 2000 248217 | 9/2000 |
| JP | 2000 513396 | 10/2000 |

* cited by examiner

*Primary Examiner*—Jerry A. Lorengo
*Assistant Examiner*—Veronica Faison Gee
(74) *Attorney, Agent, or Firm*—Baker Botts, L.L.P.

(57) ABSTRACT

A water-based ink set for ink-jet recording includes at least a yellow ink, a magenta ink and a cyan ink. At least one color ink of the yellow, magenta and cyan inks includes a first ink and a second ink which have different hue angles h having therebetween the color range of the normal color of the color ink. Preferably, the yellow ink includes a greenish yellow ink having a hue angle h of about 95° to about 110° and a reddish yellow ink having a hue angle h of about 70° to about 85°; the magenta ink includes a reddish magenta ink having a hue angle h of about 0° to about 10° and a violetish magenta ink having a hue angle h of about 340° to about 350°; and the cyan ink includes a bluish cyan ink having a hue angle h of about 250° to about 260° and a greenish cyan ink having a hue angle h of about 230° to about 240°.

11 Claims, 1 Drawing Sheet

WATER-BASED INK SET FOR INK-JET RECORDING

BACKGROUND OF THE INVENTION

1. Field of the Invention

The present invention relates to a water-based ink set for ink-jet recording composed of a plurality of inks.

2. Description of the Related Art

When a color image is expressed by an ink-jet recording method, a three-color ink set has been generally used, composed of a yellow ink (Y), a magenta ink (M) and a cyan ink (C). Moreover, a four-color ink set has also been used in which a black ink (K) is further added to the standard three-color ink set. When a color image is formed, it is desirable that a wide range of natural colors be expressed in the image. In order to achieve this with the above color ink sets, hue (or color such as red or blue) is controlled by changing the formation ratio of dots for each of the yellow, magenta and cyan inks discharged from a head. In addition, lightness (or brightness) is controlled by changing the formation density of dots for each of the inks.

Recently, additional inks have been used in addition to the abovementioned four color inks (Y, M, C and K) to form an ink set composed of five to seven inks. This has been done to obtain improved image reproducibility and improved color reproducibility over a wide range of colors. These additional inks include a yellow ink having a low color density (a light yellow ink), a magenta ink having a low color density (a light magenta ink) and a cyan ink having a low color density (a light cyan ink). Further, another method is proposed in which at least one of a blue ink (B), a violet ink (V), a red ink (R), an orange ink (O) and a green ink (G) is employed in addition to the above four color inks (Y, M, C and K) (see Japanese Patent Application Laid-Open No. 2000-248217).

However, even with the above improvements, the desired chromaticity and saturation are not always obtained in an ink-jet recording color image. This is the case when the light yellow, light magenta or light cyan ink having a low color density is added to the conventional four color inks (Y, M, C and K). This is also the case when the additional inks including at least one of the blue ink (B), the violet ink (V), the red ink (R), the orange ink (O) and the green ink (G) are added to the conventional four color inks (Y, M, C and K).

SUMMARY OF THE INVENTION

Accordingly, it is an object of the present invention to provide a water-based ink set for ink-jet recording in which each of the inks constituting the ink set has an excellent color developing property and in which intermediate colors can be developed by use of a combination of the inks. In addition, improved image reproducibility and excellent color reproducibility over a wide range can be achieved by use of the ink set.

The present inventors have found a way of achieving excellent image reproducibility and excellent color reproducibility over a wide range in a water-based ink set for ink-jet recording comprising at least a yellow ink, a magenta ink and a cyan ink. That is, as a color ink of at least one of the yellow, magenta and cyan inks, a first ink and a second ink are employed in place of an ink having the normal color of the color ink. These first and second inks have different hue angles h having therebetween the color range of the normal color of the color ink. These inks themselves have an excellent color developing property in the color range thereof and develop excellent intermediate colors in combination with other inks.

Therefore, the present invention provides a water-based ink set for ink-jet recording comprising at least a yellow ink, a magenta ink and a cyan ink. As a color ink of at least one of the yellow, magenta and cyan inks, a first ink and a second ink are provided, which have different hue angles h having therebetween the color range of the normal color of the color ink. More specifically, in one aspect, the present invention provides a water-based ink set comprising a greenish yellow ink having a hue angle h of about 95° to about 110° and a reddish yellow ink having a hue angle h of about 70° to about 85° each serving as the yellow ink. In another aspect, the present invention provides a water-based ink set comprising a reddish magenta ink having a hue angle h of about 0° to about 10° and a violetish magenta ink having a hue angle h of about 340° to about 350° each serving as the magenta ink. In still another aspect, the present invention provides a water-based ink set comprising a bluish cyan ink having a hue angle h of about 250° to about 260° and a greenish cyan ink having a hue angle h of about 230° to about 240° each serving as the cyan ink.

In the water-based ink set for ink-jet recording of the present invention, at least one color ink of the yellow (Y), magenta (M) and cyan (C) inks employed for expressing a color image is composed of a first ink and a second ink. These first and second inks have different colors having therebetween the color range of the normal color of the color ink. These inks themselves have an excellent color developing property in the color range thereof and develop excellent intermediate colors in combination with each other or other inks. Thus, according to the water-based ink set for ink-jet recording of the present invention, excellent image reproducibility and excellent color reproducibility over a wide range can be obtained.

BRIEF DESCRIPTION OF THE DRAWING

The drawing is a graph showing a color reproduced range at lightness $L^*=60$ for Example 1 and Comparative Example 1.

DETAILED DESCRIPTION OF THE INVENTION

Figure 1:
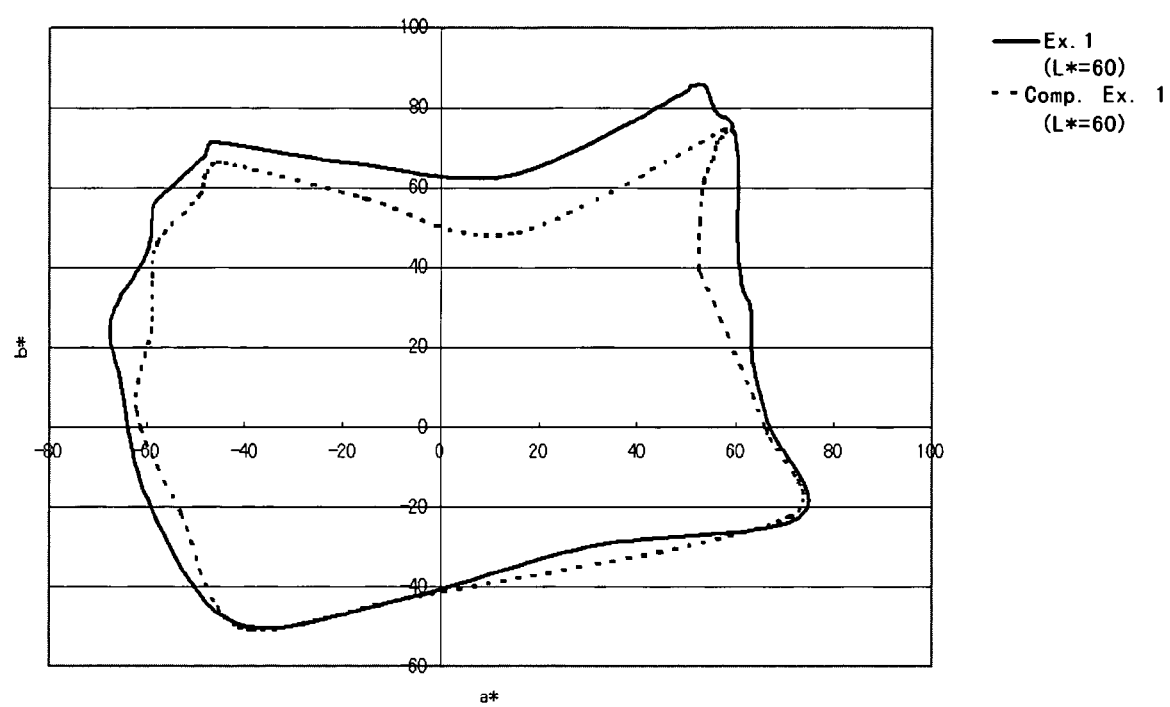

The present invention will now be described in detail.

The water-based ink set for ink-jet recording of the present invention comprises at least a yellow ink, a magenta ink and a cyan ink. This water-based ink set is characterized in that a color ink of at least one of these inks is composed of a first ink and a second ink which have different colors having therebetween the color range of the normal color of the color ink. As used herein, the term of "normal color" refers to a color obtained by use of a single ink of a conventional yellow (Y), magenta (M) or cyan (C) ink. More specifically, in the case of the yellow ink, the normal color has a color range having a lightness $L^*$ of about 85 to about 90 and a hue angle h of more than about 85° and less than about 95°. In the case of the magenta ink, the normal color has a color range having a lightness $L^*$ of about 40 to about 60 and a hue angle h of more than about 350° and less than about 360°. Further, in the case of the cyan ink, the normal color has a color range having a lightness $L^*$ of about 50 to about 65 and a hue angle h of more than about 240° and less than about 250°.

In the present invention, the value of the hue angle h of each of the inks is a value obtained by measuring color in a printed object by means of a spectrocolorimeter. In this case, the object is printed such that an area on recording paper is fully covered with ink (solidly printing) at a resolution of 1,200×1,200 dpi by use of an ink-jet printer. Further, the recording paper employed for the printing has a grammage of about 65 to about 100 g/cm$^2$, a thickness of about 80 to about 110 μm, a whiteness of about 80% or higher and an opacity of about 75% or higher. Specific examples of recording paper having the above specifications include Great White MultiUse 20 paper (product of International Paper Company), Data Copy (product of M-real) and 4200 DP 20 lb (product of XEROX Corporation). However the present invention is not limited to the particular recording paper.

Examples of ink-jet printers which may be used for the solid printing of the object include a digital multifunction device equipped with an ink-jet printer MFC-3100C (product of Brother Industries, Ltd.). Examples of the spectrocolorimeter which can be used include SC-T (product of Suga Test Instruments Co., Ltd.) and Spectrolino (product of Gretag Macbeth). The hue angle h is measured by use of light source $D_{65}$ at a viewing angle of 2°. Further, an L* value of about 85 to about 90 is employed for yellow-based inks (a greenish yellow ink, a reddish yellow ink and a yellow ink), an L* value of about 40 to about 60 is employed for magenta-based inks (a reddish magenta ink, a violetish magenta ink and a magenta ink), and an L* value of about 50 to about 65 is employed for cyan-based inks (a bluish cyan ink, a greenish cyan ink and a cyan ink).

In the ink set of the present invention, the first and second inks may be employed in place of a normal color ink of the yellow, magenta or cyan ink. These first and second inks have different hue angles h having therebetween the color range of the normal color ink. When these first and second inks are employed, each of these inks has a hue similar to that of the normal color ink.

As the yellow ink, the first and second inks may be employed which have the color range of the normal yellow color therebetween. In this case, preferably, a greenish yellow ink having a hue angle h of about 95° to about 110° is employed as the first ink, and a reddish yellow ink having a hue angle h of about 70° to about 85° is employed as the second ink. If the hue angle h of the first ink is smaller than about 95°, the color reproducible range of the yellow color is not broadened even when the second ink is employed. Also, if the hue angle h of the first ink is larger than about 110°, the color reproducible range of the yellow color is not broadened even when the second ink is employed, and the color range of the normal yellow color cannot be expressed. Further, if the hue angle h of the second ink is smaller than about 70°, the color reproducible range of the yellow color is not broadened even when the first ink is employed, and the color range of the normal yellow color cannot be expressed. Also, if the hue angle h of the second ink is larger than about 85°, the color reproducible range of the yellow color is not broadened even when the first ink is employed.

As the magenta ink, the first and second inks may be employed which have the color range of the normal magenta color therebetween. In this case, preferably, a reddish magenta ink having a hue angle h of about 0° to about 10° is employed as the first ink, and a violetish magenta ink having a hue angle h of about 340° to about 350° is employed as the second ink. If the hue angle h of the first ink is smaller than about 0°, the color reproducible range of the magenta color is not broadened even when the second ink is employed. Also, if the hue angle h of the first ink is larger than about 10°, the color reproducible range of the magenta color is not broadened even when the second ink is employed, and the color range of the normal magenta color cannot be expressed. Further, if the hue angle h of the second ink is smaller than about 340°, the color reproducible range of the magenta color is not broadened even when the first ink is employed, and the color range of the normal magenta color cannot be expressed. Also, if the hue angle h of the second ink is larger than about 350°, the color reproducible range of the magenta color is not broadened even when the first ink is employed.

Similarly, as the cyan ink, the first and second inks may be employed which have the color range of the normal cyan color therebetween. In this case, preferably, a bluish cyan ink having a hue angle h of about 250° to about 260° is employed as the first ink, and a greenish cyan ink having a hue angle h of about 230° to about 240° is employed as the second ink. If the hue angle h of the first ink is smaller than about 250°, the color reproducible range of the cyan color is not broadened even when the second ink is employed. Also, if the hue angle h of the first ink is larger than about 260°, the color reproducible range of the cyan color is not broadened even when the second ink is employed, and the color range of the normal cyan color cannot be expressed. Further, if the hue angle h of the second ink is smaller than about 230°, the color reproducible range of the cyan color is not broadened even when the first ink is employed, and the color range of the normal cyan color cannot be expressed. Also, if the hue angle h of the second ink is larger than about 240°, the color reproducible range of the cyan color is not broadened even when the first ink is employed.

In the ink set of the present invention, any one or more inks selected from among the yellow, magenta and cyan inks may be composed of the corresponding first and second inks having therebetween the color range of the abovementioned normal color. Alternatively, all of the yellow, magenta and cyan inks may be composed of the corresponding first and second inks having therebetween the color range of the corresponding normal color.

Each of the inks constituting the ink set for ink-jet recording comprises at least water, a coloring agent and a water soluble organic solvent.

The coloring agent employed in each of the inks may be either a water soluble dye or a pigment, but a water soluble dye is preferable since it is superior in the color developing property. Further, only one kind of coloring agent may be employed in each of the inks, but a plurality of coloring agents may be employed.

More specifically, when the greenish yellow ink having a hue angle h of about 95° to about 110° is formed of one kind of coloring agent, a water soluble dye having a hue angle h of about 95° to about 110° is employed as the coloring agent for this ink. Examples of the water soluble dye include C. I. Acid Yellow 23, C. I. Direct Yellows 132 and 142 and the like. When the reddish yellow ink having a hue angle h of about 70° to about 85° is formed of one kind of coloring agent, a water soluble dye having a hue angle h of about 70° to about 85° is employed as the coloring agent for this ink. Examples of the water soluble dye include C. I. Acid Yellow 99, C. I. Direct Yellow 86 and the like.

When the reddish magenta ink having a hue angle h of about 0° to about 10° is formed of one kind of coloring agent, a water soluble dye having a hue angle h of about 0° to about 10°, such as C. I. Direct Red 80 and the like, is employed as the coloring agent for this ink. When the violetish magenta ink having a hue angle h of about 340° to about 350° is formed of one kind of coloring agent, a water soluble dye having a hue angle h of about 340° to about 350°, such as C. I. Acid Red 254 and the like, is employed as the coloring agent for this ink.

The coloring agent for the greenish cyan ink having a hue angle h of about 230° to about 240° can be prepared by combining a cyan water soluble dye having a hue angle h of about 240° to about 250° with a green water soluble dye having a hue angle h of about 190° to about 210°. Examples of the cyan water soluble dye having a hue angle h of about 240° to about 250° include C. I. Acid Blue 9, C. I. Direct Blues 86, 87 and 199 and the like. Examples of the green water soluble dye include C. I. Acid Greens 3, 15 and 25 and the like.

When the bluish cyan ink having a hue angle h of about 250° to about 260° is formed of one kind of coloring agent, a water soluble dye having a hue angle h of about 250° to about 260°, such as C. I. Acid Blue 112 and the like, is employed as the coloring agent for this ink.

When a yellow ink, a magenta ink or a cyan ink having the normal color is employed in the ink set of the present invention, a coloring agent employed in conventional normal color inks may be employed as the coloring agent for forming the ink.

A black ink may be included in the ink set of the present invention in accordance with need. A carbon black may be employed as the coloring agent of the black ink. Examples of carbon black include MA8, MA100 (products of Mitsubishi Chemical Corporation), color black FW200 (product of Degussa) and the like. In addition, a self-dispersing type carbon black which can be dispersed in water without using a dispersing agent may be employed as the carbon black. The self-dispersing type carbon black can be obtained by subjecting a carbon black to a treatment in which at least one compound containing a hydrophilic group such as a carbonyl group, a carboxyl group, a hydroxyl group or a sulfone group or a salt thereof is bound to the surface of the carbon black. Specific examples of the surface treatment include a method disclosed in Japanese Patent Application Laid-Open No. Hei8-3498 (corresponding to U.S. Pat. No. 5,609,671) and a method disclosed in Published Japanese translation of PCT international application No. 2000-513396 (corresponding to WO97/48769). In addition, a commercial product such as CAB-O-JET (a registered trade mark) 200, 300 (products of Cabot Corporation) or BONJET (a registered trade mark) CW1 (product of Orient Chemical Industries, Ltd.) may be employed as the self-dispersing black pigment.

When a water soluble dye is employed, the content of the coloring agent in each of the inks (the content of the dye as a solid with respect to the total amount of the ink) is about 0.1 to about 20 wt. %, preferably about 0.5 to about 10 wt. %, and more preferably about 2 to about 5 wt. %. The content less than about 0.1 wt. % is not preferable since the color is unsatisfactorily developed. Also, the content more than about 20 wt. % is not preferable since clogging of, for example, a nozzle for an ink-jet recording head or the precipitation of the coloring agent occurs.

Preferably, a polyhydric alcohol monoalkyl ether having a low odor and a low vapor pressure is employed as the water soluble organic solvent in each of the inks. The polyhydric alcohol monoalkyl ether acts as a penetrant which effectively enhances the penetration rate of ink into recording paper. Hence, the drying characteristics of ink on paper can be improved, thereby preventing breeding (blurring at a boundary of different colors) caused by the slow drying characteristics of ink on recording paper. In addition, the occurrence of feathering (hair-like blurring along paper fibers) associated with the penetration of ink can be reduced.

Specific examples of the polyhydric alcohol monoalkyl ether include diethylene glycol methyl ether, diethylene glycol butyl ether, diethylene glycol isobutyl ether, dipropylene glycol methyl ether, dipropylene glycol propyl ether, dipropylene glycol isopropyl ether, dipropylene glycol butyl ether, triethylene glycol methyl ether, triethylene glycol butyl ether, tripropylene glycol methyl ether, tripropylene glycol butyl ether and the like.

The content of the polyhydric alcohol monoalkyl ether with respect to the total amount of each ink is preferably about 0.3 to about 15 wt. %, and more preferably about 0.4 to about 10 wt. %. If the content is less than about 0.3 wt. %, the penetration rate of the ink into recording paper is low, and thus problems are likely to arise in drying time and blurring. On the other hand, if the content exceeds about 15 wt. %, the penetration of the ink is enhanced. In this case, the ink may reach the back of recording paper, and problems are likely to arise in blurring.

A monohydric alcohol such as ethanol or isopropyl alcohol may be employed as a penetrant which controls the penetration of ink into recording paper and the drying characteristics of ink.

Preferably, high purity water such as ion-exchanged water or distilled water is used as the water employed in each ink. The content of water with respect to the total amount of each ink is preferably about 10 to about 98 wt. %, more preferably about 30 to about 97 wt. %, and most preferably about 40 to about 95 wt. %. If the content is less than about 10 wt. %, the viscosity of the ink increases to cause the ink to be difficult to eject. On the other hand, if the content exceeds about 98 wt. %, the coloring agent precipitates or aggregates due to the evaporation of water. Thus, disadvantageously, clogging is likely to occur in a nozzle of an ink-jet recording head.

In addition to the abovementioned components, other various agents such as a dispersing agent, a viscosity modifier, a surface tension modifier, a pH modifier, a preservative, and a mildewproofing agent may be added to each of the inks.

The water-based ink set for ink-jet recording of the present invention is applicable to an ink-jet recording method such as an electrostatic suction method, a method using a piezoelectric element, a thermal method and the like.

EXAMPLES

The present invention will next be specifically described by way of Examples.

Examples 1 to 7 and Comparative Examples 1 to 13

(1) Preparation of Inks

Greenish yellow ink YL-1 was prepared to have the ink composition shown in Table 1A as follows. First, 77 parts by weight of water, 18 parts by weight of glycerin and 2 parts by weight of dipropylene glycol propyl ether were mixed to prepare 97 parts by weight of an ink solvent. Subsequently, 3 parts by weight of C. I. Acid Yellow 23 were added to the ink solvent under stirring. The mixture was continued to stir for 30 minutes and filtrated with a membrane filter having a pore size of 2.5 µm to obtain the greenish yellow ink YL-1.

Inks having the ink compositions shown in Tables 1A to 1C were prepared by means of procedures similar to that for the greenish yellow ink YL-1.

(2) Measurement of the Hue Angle h

Each of the prepared inks was filled into an ink cartridge, and the ink cartridge was attached to a digital multifunction device equipped with an ink-jet printer (MFC-3100C, product of Brother Industries, Ltd.). Subsequently, printing was performed on recording paper (Great White MultiUse 20 paper, product of International Paper Company) at a resolution of 1,200×1,200 dpi such that an area is fully covered with the ink.

The obtained printed object were measured for the hue angle h (light source: $D_{65}$, viewing angle: 2°) by means of a spectrocolorimeter (SC-T, product of Suga Test Instruments Co., Ltd.). The hue angle h was obtained at $L^*$=85 to 90 for the printed object by use of the yellow-based inks, at $L^*$=40 to 60 for the printed object by use of the magenta-based inks and at $L^*$=50 to 65 for the printed object by use of the cyan-based inks. The measurement results are shown in Tables 1A to 1C.

TABLE 1A

|  |  | Greenish yellow ink | | Reddish yellow ink | | Yellow ink | | | |
|---|---|---|---|---|---|---|---|---|---|
|  |  | YL-1 | YL-2 | YO-1 | YO-2 | YN-1 | YN-2 | YN-3 | YN-4 |
| Ink composition (wt %) | C.I. Acid Yellow 23 | 3.0 |  |  |  |  |  | 1.5 |  |
|  | C.I. Acid Yellow 132 |  | 2.5 |  |  |  |  |  | 3.0 |
|  | C.I. Acid Yellow 99 |  |  | 2.6 |  |  |  |  |  |
|  | C.I. Direct Yellow 86 |  |  |  | 2.3 |  |  | 1.5 |  |
|  | C.I. Direct Red 80 |  |  |  |  |  |  |  |  |
|  | C.I. Acid Red 254 |  |  |  |  |  |  |  |  |
|  | C.I. Acid Red 249 |  |  |  |  |  |  |  |  |
|  | C.I. Acid Red 92 |  |  |  |  |  |  |  |  |
|  | C.I. Acid Blue 112 |  |  |  |  |  |  |  |  |
|  | C.I. Direct Blue 199 |  |  |  |  |  |  |  |  |
|  | C.I. Direct Blue 86 |  |  |  |  |  |  |  |  |
|  | C.I. Direct Blue 87 |  |  |  |  |  |  |  |  |
|  | C.I. Acid Green 3 |  |  |  |  | 2.5 |  |  |  |
|  | C.I. Acid Green 15 |  |  |  |  |  |  |  | 0.3 |
|  | C.I. Acid Orange 56 |  |  |  |  |  | 2.5 |  |  |
|  | C.I. Acid Orange 51 |  |  |  |  |  |  |  |  |
|  | C.I. Direct Violet 48 |  |  |  |  |  |  |  |  |
|  | Glycerin | 18.0 | 30.0 | 18.0 | 30.0 | 30.0 | 18.0 | 18.0 | 30.0 |
|  | Dipropylene glycol propyl ether | 2.0 |  |  |  | 2.0 |  | 2.0 |  |
|  | Triethylene glycol butyl ether |  | 4.0 |  | 3.5 |  |  |  | 4.0 |
|  | Tripropylene glycol butyl ether |  |  | 0.5 |  |  | 0.4 |  |  |
|  | Ultra pure water | Balance | Balance | Balance | Balance | Balance | Balance | Balance | Balance |
| h value/° |  | 96.3 | 99.3 | 80.5 | 84.1 | 180.8 | 44.9 | 94.5 | 120.3 |

TABLE 1B

|  |  | Reddish magenta ink | | Violetish magenta ink | | Magenta ink | | |
|---|---|---|---|---|---|---|---|---|
|  |  | MR-1 | MR-2 | MV-1 | MV-2 | MN-1 | MN-2 | MN-3 |
| Ink composition (wt %) | C.I. Acid Yellow 23 |  |  |  |  |  |  |  |
|  | C.I. Acid Yellow 132 |  |  |  |  |  |  |  |
|  | C.I. Acid Yellow 99 |  |  |  |  |  |  |  |
|  | C.I. Direct Yellow 86 |  |  |  |  |  |  |  |
|  | C.I. Direct Red 80 | 3.0 |  |  |  |  |  | 1.0 |
|  | C.I. Acid Red 254 |  |  | 2.5 |  |  |  |  |
|  | C.I. Acid Red 249 |  | 2.5 |  |  |  |  | 2.0 |
|  | C.I. Acid Red 92 |  |  |  | 2.5 |  |  |  |
|  | C.I. Acid Blue 112 |  |  |  |  |  |  |  |
|  | C.I. Direct Blue 199 |  |  |  |  |  |  |  |
|  | C.I. Direct Blue 86 |  |  |  |  |  |  |  |
|  | C.I. Direct Blue 87 |  |  |  |  |  |  |  |
|  | C.I. Acid Green 3 |  |  |  |  |  |  |  |
|  | C.I. Acid Green 15 |  |  |  |  |  |  |  |
|  | C.I. Acid Orange 56 |  |  |  |  |  |  |  |
|  | C.I. Acid Orange 51 |  |  |  |  | 3.0 |  |  |
|  | C.I. Direct Violet 48 |  |  |  |  |  | 2.5 |  |
|  | Glycerin | 18.0 | 18.0 | 30.0 | 30.0 | 30.0 | 30.0 | 18.0 |
|  | Dipropylene glycol propyl ether | 2.0 |  |  |  | 2.0 | 2.0 |  |
|  | Triethylene glycol butyl ether |  |  | 4.0 | 3.0 |  |  |  |
|  | Tripropylene glycol butyl ether |  | 0.5 |  |  |  |  | 0.4 |
|  | Ultra pure water | Balance | Balance | Balance | Balance | Balance | Balance | Balance |
| h value/° |  | 8.3 | 2.1 | 342.2 | 349.3 | 34.3 | 316.6 | 357.8 |

TABLE 1C

|  |  | Bluish cyan | | Greenish cyan | | Cyan ink | | |
|---|---|---|---|---|---|---|---|---|
|  |  | CB-1 | CB-2 | CG-1 | CG-2 | CN-1 | CN-2 | CN-3 |
| Ink composition (wt %) | C.I. Acid Yellow 23 | | | | | | | |
|  | C.I. Acid Yellow 132 | | | | | | | |
|  | C.I. Acid Yellow 99 | | | | | | | |
|  | C.I. Direct Yellow 86 | | | | | | | |
|  | C.I. Direct Red 80 | | | | | | | |
|  | C.I. Acid Red 254 | | | | | | | |
|  | C.I. Acid Red 249 | | | | | | | |
|  | C.I. Acid Red 92 | | | | | | | |
|  | C.I. Acid Blue 112 | 3.0 | | | | | | |
|  | C.I. Direct Blue 199 | | | | 3.0 | | 2.8 | 3.0 |
|  | C.I. Direct Blue 86 | | 3.0 | 2.5 | | | | |
|  | C.I. Direct Blue 87 | | | | | 2.5 | | |
|  | C.I. Acid Green 3 | | | 0.1 | 0.05 | | 1.2 | |
|  | C.I. Acid Green 15 | | | | | | | |
|  | C.I. Acid Orange 56 | | | | | | | |
|  | C.I. Acid Orange 51 | | | | | | | |
|  | C.I. Direct Violet 48 | | 0.05 | | | 0.8 | | |
|  | Glycerin | 18.0 | 18.0 | 30.0 | 30.0 | 18.0 | 30.0 | 30.0 |
|  | Dipropylene glycol propyl ether | 2.0 | | | 2.0 | | | 2.0 |
|  | Triethylene glycol butyl ether | | | 4.0 | | | 4.5 | |
|  | Tripropylene glycol butyl ether | | 0.5 | | | 0.5 | | |
|  | Ultra pure water | Balance | Balance | Balance | Balance | Balance | Balance | Balance |
| h value/° | | 258.0 | 250.5 | 233.1 | 239.5 | 288.5 | 211.3 | 243.5 |

(3) Printing Test

The ink sets of Examples and Comparative Examples were constituted by combining the inks shown in Tables 1A to 1C, a commercial normal yellow ink, a commercial normal magenta ink and a commercial normal cyan ink as shown in Tables 2 and 3. The commercial normal yellow ink was ink cartridge LC21Y for MFC-3100C (hue angle h=93°, product of Brother Industries, Ltd.). The commercial normal magenta ink was ink cartridge LC21M for MFC-3100C (hue angle h=354°, product of Brother Industries, Ltd.). The commercial normal cyan ink was ink cartridge LC21C for MFC-3100C (hue angle h=244°, product of Brother Industries, Ltd.).

Each of the inks was filled into an ink cartridge, and patch patterns containing various hues at predetermined L* values were printed as follows to evaluate color reproducibility. In this test, a digital multifunction device equipped with an ink-jet printer (MFC-3100C, product of Brother Industries, Ltd.) was used as a printer, and KASSAI (a registered trade mark) glossy finishing (product of FUJI Photo Film Co., Ltd.) was used as paper for the evaluation.

In Examples 1 to 3 and Comparative Examples 1 to 13, the number of ink cartridges constituting the ink set is 4 or less. Therefore, the printing test was performed by attaching all of the ink cartridges constituting the ink set to the printer. Upon printing, a printer driver capable of printing patch patterns containing various hues was created to perform the test.

In Examples 4 to 7, the number of cartridges constituting the ink set is 5 or more. Thus, the cartridges were divided into two groups for convenience, and the two groups of the cartridges were separately attached to the printer to perform the printing test. In this case, the ink cartridges constituting the ink set were numbered as 1, 2, 3, 4, 5 and 6 in increasing order of the hue angle of the inks. First, four ink cartridges including the ink cartridges 1, 2, 3 and 4 were attached to the printer to perform the printing test. Subsequently, four ink cartridges including the previously tested cartridges 1 and 4 and the untested cartridges 5 and 6 were attached to the printer to perform the printing test. The ink of the ink cartridge 4 has the largest hue angle among the previously tested inks, and the ink of the ink cartridge 1 has the smallest hue angle among the previously tested inks. Upon printing, a printer driver capable of printing patch patterns containing various hues was created to perform the test. According to this printing method, printing by use of five or more ink cartridges attached simultaneously to a printer can be simulated by use of a printer to which only four ink cartridges can be attached.

(4) Evaluation of Color Reproducibility

The color of the patch patterns printed in (3) was measured by means of a spectrocolorimeter (Spectrolino, product of Gretag Macbeth) for each of Examples and Comparative Examples to determine a* values and b* values. Subsequently, color reproduced areas were determined at L*=40, 50, 60, 70 and 80.

The shown drawing is a graph of a color reproduced range at L*=60 for Example 1 and Comparative Example 1. As can be seen in the drawing, the color reproduced range of Example 1 is larger than that of Comparative Example 1. Particularly, the color reproduced range of yellow is enlarged.

The color reproduced areas of each of the Examples and Comparative Examples were compared with the color reproduced areas of Comparative Example 1 for the same L* value. The color reproducibility was evaluated from the obtained results by the following four ratings. These results are shown in Tables 2, 3A and 3B.

A: More than 110%
B: More than 105% and 110% or less
C: More than 90% and 105% or less
D: 90% or less In this evaluation, the color reproducibility of an ink set is considered to be superior to that of the commercial ink set of Comparative Example 1 when the results contain the rank A or B but do not contain the rank C or D for each L* value.

As can be seen from the results in Tables 2 and 3, in the ink sets of Examples 1 to 7, each ink itself has an excellent color developing property. In addition, good intermediate colors can be developed by combining a plurality of inks to thereby achieve excellent image reproducibility and excellent color reproducibility over a wide range. Particularly, when, in place of an ink having the normal color of yellow, magenta or cyan, two inks having therebetween the color range of the normal color are employed, the normal color can be reproduced even better than the normal color expressed by use of the normal color ink. Moreover, the color reproducibility can be improved even when the lightness L* is low.

On the other hand, in the ink sets of Comparative Examples 1 to 13, intermediate colors cannot be satisfactorily expressed, and thus the image reproducibility and the color reproducibility are poor. In Comparative Example 2, two inks having therebetween the color range of the normal yellow color are employed in place of the normal yellow ink of Comparative Example 1. However, these two inks have a green hue and a vermilion hue, respectively. Since these two inks are no longer categorized as a yellow-based ink, the poor color reproducibility evaluation was given to the ink set. Similarly, in the ink sets of Comparative Examples 3, 9, 10, 11 and 12, two inks having therebetween the color range of the corresponding normal color are employed in place of the normal yellow ink, the normal magenta ink or the normal cyan ink. However, at least one of the two inks is no longer categorized as a yellow-based ink, a magenta-based ink or a cyan-based ink, and thus the poor color reproducibility evaluation was given to the ink sets.

In Comparative Example 4, two inks are employed as the cyan-based ink. However, these two inks do not have the color range of the normal cyan color therebetween. In Comparative Example 5, inks having the normal colors are employed for all three colors. In Comparative Example 6, the greenish cyan ink employed has a hue angle located outside the color range of the normal cyan color. However, a bluish cyan ink, which is used together with the greenish cyan ink for interposing the color range of the normal cyan color therebetween, is not employed. In Comparative Examples 7, 8 and 13, the inks employed have hue angles excessively apart from the normal color. Further, in Comparative Example 13, the reddish yellow ink employed as the yellow-based ink has a hue angle located outside the color range of the normal color. However, a greenish yellow ink, which is used together with the reddish yellow ink for interposing the color range of the normal yellow color therebetween, is not employed. Therefore, the poor color reproducibility evaluations were given to these ink sets in all of these comparative Examples.

TABLE 2

| | Example 1 | Example 2 | Example 3 | Example 4 | Example 5 | Example 6 | Example 7 |
|---|---|---|---|---|---|---|---|
| Yellow ink composition | YL-2/YO-2 | LC21Y | LC21Y | YL-1/YO-1 | LC21Y | YL-1/YO-1 | YL-2/YO-2 |
| Magenta ink composition | LC21M | MR-2/MV-1 | LC21M | MR-2/MV-1 | MR2-/MV-1 | LC21M | MR-1/MV-2 |
| Cyan ink composition | LC21C | LC21C | CB-1/CG-1 | LC21C | CB-2/CG-1 | CB-1/CG-2 | CB-2/CG-2 |
| $L^* = 40$ Color area | 13490 | 16271 | 16711 | 16866 | 16911 | 16809 | 17098 |
| Area ratio with Comp. Ex. 1 | 107.1% | 129.2% | 132.7% | 133.9% | 134.3% | 133.5% | 135.8% |
| Color reproducibility | B | A | A | A | A | A | A |
| $L^* = 50$ Color area | 20555 | 20298 | 20146 | 20612 | 20351 | 20591 | 20733 |
| Area ratio with Comp. Ex. 1 | 107.2% | 105.9% | 105.1% | 107.5% | 106.2% | 107.4% | 108.2% |
| Color reproducibility | B | B | B | B | B | B | B |
| $L^* = 60$ Color area | 18210 | 17600 | 17720 | 17998 | 17880 | 17752 | 18017 |
| Area ratio with Comp. Ex. 1 | 112.9% | 109.2% | 109.9% | 111.6% | 110.9% | 110.1% | 111.7% |
| Color reproducibility | A | B | B | A | A | A | A |
| $L^* = 70$ Color area | 13955 | 12510 | 10920 | 12337 | 11367 | 14005 | 14028 |
| Area ratio with Comp. Ex. 1 | 163.7% | 146.7% | 128.1% | 144.7% | 133.3% | 164.3% | 164.5% |
| Color reproducibility | A | A | A | A | A | A | A |
| $L^* = 80$ Color area | 10845 | 5417 | 6795 | 10216 | 6485 | 10851 | 10882 |
| Area ratio with Comp. Ex. 1 | 210.6% | 105.2% | 132.0% | 198.4% | 125.9% | 210.7% | 211.3% |
| Color reproducibility | A | B | A | A | A | A | A |

TABLE 3A

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Yellow ink composition | LC21Y | YN-1/YN-2 | LC21Y | LC21Y | YN-3 | LC21Y | YN-1 |
| Magenta ink composition | LC21M | LC21M | MN-1/MN-2 | LC21M | LC21M | LC21M | MN-1 |
| Cyan ink composition | LC21C | LC21C | LC21C | CG-1/CG-2 | LC21C | CG-2 | LC21C |
| $L^* = 40$ Color area | 12592 | 12846 | 12511 | 12571 | 12600 | 12491 | 12165 |
| Area ratio with Comp. Ex. 1 | — | 102.0% | 99.4% | 99.8% | 100.1% | 99.2% | 96.6% |
| Color reproducibility | — | C | C | C | C | C | C |
| $L^* = 50$ Color area | 19168 | 19055 | 19096 | 19083 | 19180 | 19123 | 18884 |
| Area ratio with Comp. Ex. 1 | — | 99.4% | 99.6% | 99.6% | 100.1% | 99.8% | 98.5% |
| Color reproducibility | — | C | C | C | C | C | C |

TABLE 3A-continued

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| $L^* = 60$ | Color area | 16124 | 15388 | 16081 | 16002 | 16200 | 16056 | 15236 |
|  | Area ratio with Comp. Ex. 1 | — | 95.4% | 99.7% | 99.2% | 100.5% | 99.6% | 94.5% |
|  | Color reproducibility | — | C | C | C | C | C | C |
| $L^* = 70$ | Color area | 8526 | 8143 | 8622 | 8467 | 8563 | 8469 | 8036 |
|  | Area ratio with Comp. Ex. 1 | — | 95.5% | 101.1% | 99.3% | 100.4% | 99.3% | 94.3% |
|  | Color reproducibility | — | C | C | C | C | C | C |
| $L^* = 80$ | Color area | 5149 | 5031 | 5171 | 5226 | 5198 | 5155 | 4589 |
|  | Area ratio with Comp. Ex. 1 | — | 97.7% | 100.4% | 101.5% | 101.0% | 100.1% | 89.1% |
|  | Color reproducibility | — | C | C | C | C | C | D |

TABLE 3B

|  |  | Comparative Example 8 | Comparative Example 9 | Comparative Example 10 | Comparative Example 11 | Comparative Example 12 | Comparative Example 13 |
|---|---|---|---|---|---|---|---|
| Yellow ink composition |  | YN-4 | YO-1/YN-1 | LC21Y | YN-3 | YL-2 | YO-1 |
| Magenta ink composition |  | MN-1 | LC21M | MN-1/MN-2 | LC21M | MN-1 | MN-2 |
| Cyan ink composition |  | LC21C | LC21C | CB-1 | CN-1/CN-2 | CN-1/CN-2 | CN-1 |
| $L^* = 40$ | Color area | 12215 | 12701 | 12097 | 12621 | 12008 | 12031 |
|  | Area ratio with Comp. Ex. 1 | 97.0% | 100.9% | 96.1% | 100.2% | 95.4% | 95.5% |
|  | Color reproducibility | C | C | C | C | C | C |
| $L^* = 50$ | Color area | 19005 | 19205 | 18572 | 19027 | 18366 | 18698 |
|  | Area ratio with Comp. Ex. 1 | 99.1% | 100.2% | 96.9% | 99.3% | 95.8% | 97.5% |
|  | Color reproducibility | C | C | C | C | C | C |
| $L^* = 60$ | Color area | 15390 | 16105 | 14421 | 15462 | 14356 | 14999 |
|  | Area ratio with Comp. Ex. 1 | 95.4% | 99.9% | 89.4% | 95.9% | 89.0% | 93.0% |
|  | Color reproducibility | C | C | D | C | D | C |
| $L^* = 70$ | Color area | 8117 | 8369 | 8105 | 8436 | 8352 | 7936 |
|  | Area ratio with Comp. Ex. 1 | 95.2% | 98.2% | 95.1% | 98.9% | 98.0% | 93.1% |
|  | Color reproducibility | C | C | C | C | C | C |
| $L^* = 80$ | Color area | 4608 | 5069 | 5063 | 5139 | 5006 | 4582 |
|  | Area ratio with Comp. Ex. 1 | 89.5% | 98.4% | 98.3% | 99.8% | 97.2% | 89.0% |
|  | Color reproducibility | D | C | C | C | C | D |

The water-based ink set for ink-jet recording of the present invention provides inks which have excellent image reproducibility and excellent color reproducibility over a wide range and are suitable for a printer for ink-jet recording.

The entire disclosure of the specification, claims, summary and drawing of Japanese Patent Application No. 2004-355901 filed Dec. 8, 2004 is hereby incorporated by reference.

What is claimed is:

1. A water-based ink set for ink-jet recording comprising a plurality of color inks
each of at least one of said plurality of color inks comprising a first ink and a second ink, said first ink having a first hue angle and said second ink having a second hue angle, wherein said first hue angle is not equal to said second hue angle and a differential range therebetween is a hue angle color range of a normal color of said at least one of said plurality of color inks.

2. The water-based ink set for ink-jet recording according to claim 1, wherein said at least one of said plurality of color inks is a yellow ink, and
said first ink is a greenish yellow ink having said first hue angle of about 95° to about 110° and said second ink is a reddish yellow ink having said second hue angle of about 70° to about 85°.

3. The water-based ink set for ink-jet recording according to claim 1, wherein said at least one of said plurality of color inks is a magenta ink, and
said first ink is a reddish magenta ink having said first hue angle of about 0° to about 10° and said second ink is a violetish magenta ink having said second hue angle of about 340° to about 350°.

4. The water-based ink set for ink-jet recording according to claim 1, wherein said at least one of said plurality of color inks is a cyan ink, and
   said first ink is a bluish cyan ink having said first hue angle of about 250° to about 260° and said second ink is a greenish cyan ink having said second hue angle of about 230° to about 240°.

5. The water-based ink set for ink-jet recording according to claim 1, wherein:
   said at least one of said plurality of color inks are a yellow ink and a magenta ink;
   said first ink of said yellow ink is a greenish yellow ink having said first hue angle of said first yellow ink of about 95° to about 110° and said second ink of said yellow ink is a reddish yellow ink having said second hue angle of said second yellow ink of about 70° to about 85°; and
   said first ink of said magenta ink is a reddish magenta ink having said first hue angle of said first magenta ink of about 0° to about 10° and said second ink of said magenta ink is a violetish magenta ink having said second hue angle of said second magenta ink of about 340° to about 350°.

6. The water-based ink set for ink-jet recording according to claim 1, wherein:
   said at least one of said plurality of color inks are a magenta ink and a cyan ink;
   said first ink of said magenta ink is a reddish magenta ink having said first hue angle of said first magenta ink of about 0° to about 10° and said second ink of said magenta ink is a violetish magenta ink having said second hue angle of said second magenta ink of about 340° to about 350°; and
   said first ink of said cyan ink is a bluish cyan ink having said first hue angle of said first cyan ink of about 250° to about 260° and said second ink of said cyan ink is a greenish cyan ink having said second hue angle of said second cyan ink of about 230° to about 240°.

7. The water-based ink set for ink-jet recording according to claim 1, wherein:
   said at least one of said plurality of color inks are a yellow ink and a cyan ink;
   said first ink of said yellow ink is a greenish yellow ink having said first hue angle of said first yellow ink of about 95° to about 110° and said second ink of said yellow ink is a reddish yellow ink having said second hue angle of said second yellow ink of about 70° to about 85°; and
   said first ink of said cyan ink is a bluish cyan ink having said first hue angle of said first cyan ink of about 250° to about 260° and said second ink of said cyan ink is a greenish cyan ink having said second hue angle of said second cyan ink of about 230° to about 240°.

8. The water-based ink set for ink-jet recording according to claim 1, wherein:
   said at least one of said plurality of color inks are a yellow ink, a magenta ink, and a cyan
   said first ink of said yellow ink is a greenish yellow ink having said first hue angle of said first yellow ink of about 95° to about 110° and said second ink of said yellow ink is a reddish yellow ink having said second hue angle of said second yellow ink of about 70° to about 85°;
   said first ink of said magenta ink is a reddish magenta ink having said first hue angle of said first magenta ink of about 0° to about 10° and said second ink of said magenta ink is a violetish magenta ink having said second hue angle of said second magenta ink of about 340° to about 350°; and
   said first ink of said cyan ink is a bluish cyan ink having said first hue angle of said first cyan ink of about 250° to about 260° and said second ink of said cyan ink is a greenish cyan ink having said second hue angle of said second cyan ink of about 230° to about 240°.

9. The water-based ink set for ink-jet recording according to claim 1, wherein said plurality of color inks comprises at least a yellow ink, a magenta ink and a cyan ink.

10. The water-based ink set for ink-jet recording according to claim 9, wherein said at least one of said plurality of color inks is selected from the group consisting of said yellow ink, said magenta ink and said cyan ink.

11. The water-based ink set for ink-jet recording according to claim 1, wherein said at least one of said plurality of color inks is selected from the group consisting of a yellow ink, a magenta ink and a cyan ink.

* * * * *